(12) United States Patent
Schlitter et al.

(10) Patent No.: US 7,041,752 B2
(45) Date of Patent: May 9, 2006

(54) CATALYST AND METHOD FOR THE PRODUCTION OF POLYTETRAHYDROFURAN

(75) Inventors: Stephan Schlitter, Limburgerhof (DE); Christoph Sigwart, Schriesheim (DE); Walter Dörflinger, Östringen (DE); Michael Hesse, Worms (DE); Rolf-Hartmuth Fischer, Heidelberg (DE)

(73) Assignee: BASF Aktiengesellschaft, Ludwigshafen (DE)

(*) Notice: Subject to any disclaimer, the term of this patent is extended or adjusted under 35 U.S.C. 154(b) by 168 days.

(21) Appl. No.: 10/481,564

(22) PCT Filed: Jun. 24, 2002

(86) PCT No.: PCT/EP02/06962

§ 371 (c)(1),
(2), (4) Date: Dec. 22, 2003

(87) PCT Pub. No.: WO03/002631

PCT Pub. Date: Jan. 9, 2003

(65) Prior Publication Data

US 2004/0220381 A1 Nov. 4, 2004

(30) Foreign Application Priority Data

Jun. 26, 2001 (DE) .................. 101 30 782

(51) Int. Cl.
*B01J 29/06* (2006.01)
(52) U.S. Cl. .................. 526/89; 526/266; 526/268; 526/270; 526/271; 502/80
(58) Field of Classification Search .............. None
See application file for complete search history.

(56) References Cited

U.S. PATENT DOCUMENTS

| 1,642,871 | A | | 9/1927 | Chappell et al. |
| 4,228,272 | A | * | 10/1980 | Del Pesco ............ 528/413 |
| 4,228,462 | A | | 10/1980 | van Straaten |
| 5,112,943 | A | * | 5/1992 | Mueller ............... 528/483 |
| 5,886,138 | A | * | 3/1999 | Muller ................ 528/408 |
| 5,935,898 | A | * | 8/1999 | Trubenbach et al. ........ 502/150 |
| 6,034,291 | A | * | 3/2000 | Girotti et al. ............ 585/323 |
| 6,064,560 | A | * | 5/2000 | Hirahara et al. ........... 361/502 |
| 6,359,108 | B1 | * | 3/2002 | Eller et al. ............. 528/411 |
| 6,362,312 | B1 | * | 3/2002 | Eller et al. ............. 528/413 |
| 6,852,869 | B1 | * | 2/2005 | Sigwart et al. .......... 549/509 |
| 6,870,014 | B1 | * | 3/2005 | Steinbrenner et al. ...... 526/90 |
| 2003/0186806 | A1 | | 10/2003 | Steinbrenner et al. |

FOREIGN PATENT DOCUMENTS

| DE | 196 01861 | 7/1997 |
| DE | 195 13493 | 1/1999 |
| JP | 11-292958 | 10/1999 |
| WO | 94/05719 | 3/1994 |
| WO | 96/23833 | 8/1996 |
| WO | 99/36459 | 7/1999 |
| WO | 02/02671 | 1/2002 |

OTHER PUBLICATIONS

Handbook of Heterogeneous Catalysis, vol. 1, 1997, 414-417.
Derwent 94-100747, 1994.

* cited by examiner

Primary Examiner—Christina Johnson
(74) Attorney, Agent, or Firm—Jason D. Voight

(57) ABSTRACT

Polytetrahydrofuran, polytetrahydrofuran copolymers, diesters or monoesters of these polymers are prepared by polymerization of tetrahydrofuran in the presence of at least one telogen and/or comonomer, which is in the form of shaped catalyst bodies or catalyst particles having a volume of the individual shape of the body or particle of at least 0.05 mm$^3$, preferably at least 0.2 mm$^3$, in particular 1 mm$^3$, and has at least one of the features a) and b):
a) a pore radius distribution having at least one maximum in the pore radius range from 100 to 5000 Å,
b) a pore volume of catalyst pores having radii of 200–3000 Å of greater than 0.05 cm$^3$/g and/or a pore volume of pores having radii of 200–5000 Å of greater than 0.075 cm$^3$/g and/or a pore volume of pores having radii of >200 Å of greater than 0.1 cm$^3$/g.

15 Claims, No Drawings

CATALYST AND METHOD FOR THE PRODUCTION OF POLYTETRAHYDROFURAN

The present invention relates to a catalyst for preparing polytetrahydrofuran, polytetrahydrofuran copolymers, diesters or monoesters of these polymers by polymerization of tetrahydrofuran in the presence of at least one telogen and/or comonomer.

Polytetrahydrofuran (hereinafter referred to as "PTHF"), which is also known as polyoxybutylene glycol, is a versatile intermediate in the plastics and synthetic fibers industries and is employed, inter alia, as a diol component for producing polyurethane, polyester and polyamide elastomers. In addition, it is, as are some of its derivatives, a valuable auxiliary in a variety of applications, e.g. as a dispersant or in the deinking of waste paper.

In industry, PTHF is usually prepared by polymerization of tetrahydrofuran (hereinafter referred to as "THF") over suitable catalysts in the presence of reagents whose addition makes it possible to control the chain length of the polymer chains and thus to set the mean molecular weight (chain termination reagents or "telogens"). The chain length is controlled via selection of type and amount of telogen. The choice of suitable telogens additionally makes it possible to introduce functional groups at one end or at both ends of the polymer chain.

Thus, for example, the use of carboxylic acids or carboxylic anhydrides as telogens makes it possible to prepare monoesters or diesters of PTHF. PTHF itself is only formed by subsequent saponification or transesterification. This preparation is therefore referred to as a two-stage PTHF process.

Other telogens act not only as chain termination reagents but are also incorporated into the growing polymer chain of PTHF. They not only have the function of a telogen but are at the same time a comonomer and can therefore be referred to as telogens and as comonomers with equal justification. Examples of such comonomers are telogens having two hydroxy groups, for example diols (dialcohols). These can be, for example, ethylene glycol, propylene glycol, butylene glycol, 1,3-propanediol, 1,4-butanediol, 2-butyne-1,4-diol, 1,6-hexanediol or low molecular weight PTHF. Further suitable comonomers are cyclic ethers such as 1,2-alkylene oxides, e.g. ethylene oxide or propylene oxide, 2-methyltetrahydrofuran and 3-methyltetrahydrofuran. The use of such comonomers leads, with the exception of water, 1,4-butanediol and low molecular weight PTHF, to the formation of tetrahydrofuran copolymers, hereinafter referred to as THF copolymers, and in this way makes it possible to chemically modify PTHF.

Industrially, PTHF can be prepared in a single stage by polymerization of THF using water, 1,4-butanediol or low molecular weight PTHF as telogen over acid catalysts. Known catalysts include both homogeneous systems dissolved in the reaction system and heterogeneous, i.e. largely undissolved, systems. However, the relatively low THF conversions which are, in particular, achieved in the synthesis of PTHF having a molecular weight of from 650 to 3000 represent a disadvantage.

On a large industrial scale, processes employed are predominantly the abovementioned two-stage processes in which THF is firstly polymerized, e.g. in the presence of fluorosulfonic acid, to form polytetrahydrofuran esters and these are subsequently hydrolyzed to PTHF. This form of THF polymerization usually achieves higher THF conversions than do single-stage processes. A particularly advantageous method is polymerization of THF in the presence of carboxylic anhydrides or carboxylic anhydride/carboxylic acid mixtures, e.g. acetic anhydride or acetic anhydride/acetic acid mixtures, and in the presence of acid catalysts to form PTHF acetates and subsequent transesterification of the PTHF acetates with, for example, methanol to form PTHF and methyl acetate.

The preparation of PTHF by polymerization of THF in the presence of carboxylic anhydrides and/or carboxylic anhydride/carboxylic acid mixtures and the preparation of THF copolymers by polymerization of THF in the presence of carboxylic anhydrides and/or carboxylic anhydride/carboxylic acid mixtures and cyclic ethers as comonomers over solid acid catalysts, which are preferred for the purposes of the present patent application, are known.

DE-A-198 01 462 describes acid-activated calcium montmorillonites having a specific surface area of >300 $m^2/g$, an acidity of >0.02 mmol/g for $pK_a$ values of <−3 and pore volumes of >0.4 $cm^3/g$ for pore sizes in the range 30 to 200 Å as catalysts in powder or extrudate form for the polymerization of THF to form, inter alia, PTHF diacetates.

U.S. Pat. No. 4,228,462 describes a method of preparing copolymers of THF and alkylene oxides over acid-activated montmorillonites having pore volumes of 0.4 to 0.8 $cm^3/g$, average pore sizes in the range 0.1 to 0.3 μm and a surface area of 220 to 260 $m^2/g$. A continuous preparation in suspension with the catalyst being used in powder form is described.

According to DE-C2-195 13 493, calcined magnesium-aluminum hydrosilicates of the attapulgite or sepiolite type are used as catalyst for preparing polytetramethylene ether glycol diesters. The use of these catalysts instead of the known montmorillonite, zeolite or kaolin catalysts is said to lead to higher polymerization rates and more uniform properties and a more uniform molecular weight distribution of the polymers obtained.

JP-A-11-292958 describes a process for the continuous preparation of PTHF diesters having an improved molecular weight distribution. The process is carried out over a solid inorganic acid catalyst in suspension. Catalysts mentioned are catalysts of the zirconium oxide/silicon dioxide type or the bleaching earth type, with catalyst particles of <3 mm.

WO-A-94/05719 mentions amorphous aluminum silicates and also acid-activated and calcined kaolin or zeolites as catalysts for the preparation of PTHF esters of dicarboxylic acids having a narrow molecular weight distribution by polymerization of THF in a fixed bed in the presence of carboxylic anhydrides.

The abovementioned processes show that the polymerization catalysts based on sheet silicates which are used do display a high catalyst activity in powder form, i.e. in a suspension process. On the other hand, in the case of the preferred method of production in a fluidized bed or fixed bed, which offers advantages in separation from the catalyst compared to the suspension mode, the catalysts described display a greatly reduced activity when used as shaped bodies. However, the economics of a heterogeneously catalyzed PTHF process are critically dependent on the productivity of the catalyst.

It is an object of the present invention to provide a catalyst for the preparation of polytetrahydrofuran, polytetrahydrofuran copolymers, diesters or monoesters of these polymers which is easy to separate off and at the same time displays a high productivity, especially when used in a fluidized bed or fixed bed.

We have found that this object is achieved by a catalyst which is in the form of shaped bodies or particles having a volume of at least 0.05 mm³, preferably at least 0.2 mm³ and particularly preferably at least 1 mm³. Furthermore, the catalyst has at least one of the features a) and b):

a) A pore radius distribution which displays at least one maximum in the pore radius range from 100 to 5000 Å;
b) A pore volume of catalyst pores having radii of from 200 to 3000 Å of greater than 0.05 cm³/g, preferably greater than 0.075 cm³/g and/or a pore volume of catalyst pores having radii of from 200 to 5000 Å of greater than 0.075 cm³/g, preferably greater than 0.1 cm³/g and/or a pore volume of catalyst pores having a radius of >200 Å of greater than 0.1 cm³/g, preferably greater than 0.15 cm³/g.

Preference is given to catalysts which have both the features a) and b).

A volume of the individual shaped catalyst body or catalyst particle of at least 0.05 mm³ advantageously makes it possible for the catalyst to be easily separated off from the polymer, e.g. by decantation and/or filtration in the case of a suspension process or when used in a fluidized bed or fixed bed.

In a further preferred embodiment, 50% of the total pore volume is made up by pores having a diameter of <0.1 μm.

The production of shaped catalyst bodies from pulverulent raw materials can be carried out by methods known to those skilled in the art, for example tabletting, agglomeration or extrusion, as are described, for example, in the Handbook of Heterogeneous Catalysis, Vol. 1, VCH Verlagsgesellschaft Weinheim, 1997, pp. 414–417. Auxiliaries known to those skilled in the art, for example binders, lubricants and/or solvents, can be added during the shaping step. Preference is given to shaping by agglomeration or extrusion in the presence of water as auxiliary.

As raw materials for the novel shaped catalyst bodies having the abovementioned pore structure, it is possible to use pulverulent catalysts which initiate the polymerization of THF in the presence of carboxylic anhydrides or carboxylic anhydride/carboxylic acid mixtures and/or cyclic ethers. Preference is given to catalyst raw materials which display a satisfactory initial productivity when used in powder form in a standardized polymerization test. For the purposes of the present invention, initial productivity means the productivity of the catalyst at negligibly low THF conversions, as can be determined, for example, from a batchwise polymerization experiment as described in the examples. This initial productivity of the catalyst raw material in powder form is at least 0.5 g of PTHF or PTHF derivative per g of catalyst powder and hour of reaction time; preference is given to raw materials having an initial productivity of at least 1 g/g*h, particularly preferably at least 2.5 g/g*h.

The shaped catalyst bodies of the present invention are not restricted to catalysts which are produced by shaping of active compositions. The process of the present invention can likewise be carried out using catalysts produced by converting a shaped body having little or no polymerization activity into a catalyst according to the present invention by further treatment. Examples of such catalysts are bleaching earths activated as shaped bodies or mixed oxide catalysts obtained by impregnation or coating of support materials. In this embodiment, the catalysts of the present invention likewise have a powder activity of at least 0.5 g of PTHF or PTHF derivative per g of catalyst powder and hour of reaction time, preferably 1 g/g*h and particularly preferably 2.5 g/g*h. The measurement of this initial activity can be carried out, for example, on a sample obtained by milling the shaped body to obtain a powder or by measurement on a chemophysically analogous material in powder form.

As active catalyst composition, use is made of acidic solids known to those skilled in the art. According to the present invention, the use of sheet silicates is preferred. Preferred sheet silicates are those of the montmorillonite/saponite group, kaolin/serpentine group or the palygorskite/sepiolite group, particularly preferably montmorillonites, hectorites, kaolins, attapulgites or sepiolites, as are described, for example, in Klockmanns Lehrbuch der Mineralogie, 16$^{th}$ Edition, F. Euke Verlag 1978, pages 739–765.

Before use in the process of the present invention, the sheet silicate catalysts are preferably activated in acid. The activation can be carried out by methods whose principles are described, for example, in U.S. Pat. No. 1,642,871 or the references cited in EP-A-0 398 636. The acid activation can be carried out by means of various acids, preferably customary mineral acids or organic carboxylic acids. The acids are preferably selected from the group consisting of hydrochloric acid, sulfuric acid, nitric acid, phosphoric acid, formic acid, acetic acid and citric acid. Particular preference is given to sulfuric acid and/or hydrochloric acid.

To carry out the acid activation, it is possible, for example, to suspend the sheet silicate in powder form in acid and to react and activate it under known conditions. This gives an active catalyst raw material in powder form. To remove adhering traces of acid, it can subsequently be washed with distilled or deionized water and then dried or calcined. The drying of the sheet silicate catalysts is advantageously carried out at atmospheric pressure and temperatures of from 80 to 200° C., preferably from 100 to 150° C., for from 1 to 20 hours. Drying can also be carried out under reduced pressure and at lower temperatures.

However, the acid activation can also be carried out in other ways which are known per se. For example, the acid can be brought into contact with the sheet silicate by spraying or kneading with simultaneous shaping, as disclosed, for example, in WO-A-99/39820.

Calcination of the catalysts is preferably carried out at from 150 to 900° C., particularly preferably from 200 to 700° C., in particular from 300 to 500° C., for from 0.1 to 12 hours, preferably from 1 to 5 hours. Both pulverulent catalyst raw materials and preferred shaped catalyst bodies can be calcined.

The catalyst porosity specified according to the present invention is achieved by methods known to those skilled in the art. These are, for example, addition of pore formers (carboxylic acids, nitrates, ammonium salts, guanidinium salts, urotropin, proteins, carbohydrates or modified carbohydrates such as methylcellulose), inorganic additives (metal oxides, clay minerals) as mentioned in, for example, DE-A-196 01 861, choice of an appropriate particle size distribution of the catalyst powder, pretreatment of the catalyst powder, e.g. precalcination or milling of precalcined shaped bodies, and/or appropriate process parameters in the production of the shaped body, for example limited compaction of the powder in the shaping step.

As pore formers and auxiliaries and/or additives, preference is given to those in which only a low level of soluble alkaline metals and other constituents which adversely affect the catalytic activity is present and/or is formed during heat treatment and/or under the reaction conditions. Particularly preferred additives from this category are ammonium nitrate, silicon dioxides, aluminum oxides and clay minerals. The porosity can be set both in the production of the shaped catalyst bodies from active compositions and in the production of shaped bodies having little or no activity which are subsequently subjected to activation.

The catalysts which can be used according to the present invention can be employed for the polymerization in the form of, for example, cylinders, extrudates, ribbed extrudates, spheres, rings or granules.

Possible pretreatments of the catalyst are, for example, drying by means of gases such as air or nitrogen which have been heated to 80–200° C., preferably to 100–150° C.

Telogens suitable for the preparation of PTHF esters are carboxylic anhydrides and/or carboxylic anhydride/protic acid mixtures. The protic acids are preferably organic and inorganic acids which are soluble in the reaction system. Examples of organic acids are carboxylic acids and sulfonic acids. Examples of inorganic acids are sulfuric acid, hydrochloric acid, phosphoric acid.

Preference is given to using organic carboxylic acids or their anhydrides. Among these, preference is given to aliphatic and aromatic polycarboxylic and/or monocarboxylic acids containing from 2 to 12, preferably from 1 to 8, carbon atoms. Preferred examples of aliphatic carboxylic acids are acetic acid, lactic acid, propionic acid, valeric acid, caproic acid, caprylic acid and pelargonic acid. Examples of aromatic carboxylic acids are phthalic acid and naphthalenecarboxylic acid. Examples of anhydrides of aliphatic polycarboxylic acids are succinic and maleic anhydride. Particular preference is given to acetic anhydride.

The PTHF acetates formed when using the preferred telogens can be converted into PTHF by various methods (e.g. as described in U.S. Pat. No. 4,460,796).

Other copolymers of THF can be prepared by the additional use of cyclic ethers which can be polymerized with opening of the ring, preferably a three-, four- or five-membered ring, for example 1,2-alkylene oxides, e.g. ethylene oxide or propylene oxide, oxetane, substituted oxetanes such as 3,3-dimethyloxetane, the THF derivatives 2-methyltetrahydrofuran and 3-methyltetrahydrofuran, as comonomers, with particular preference being given to 2-methyltetrahydrofuran or 3-methyltetrahydrofuran.

The telogen and, if desired, the comonomer are advantageously introduced into the polymerization as solutions in THF. Since the telogen leads to chain termination or chain transfer in the polymerization, the mean molecular weight of the polymer can be controlled via the amount of telogen used. The more telogen present in the reaction mixture, the lower the mean molecular weight of the PTHF or PTHF derivative obtained. Depending on the telogen content of the polymerization mixture, it is possible to prepare PTHF, the relevant PTHF derivatives or THF copolymers having mean molecular weights of from 250 to 10000 dalton in a targeted manner. The process of the present invention is preferably used to prepare PTHF, the relevant PTHF derivatives or THF copolymers having mean molecular weights of from 500 to 5000 dalton, particularly preferably from 650 to 4000 dalton.

The polymerization is generally carried out at from 0 to 80° C., preferably from 25° C. to the boiling point of THF. The pressure employed is generally not critical for the result of the polymerization, and the polymerization is therefore generally carried out at atmospheric pressure or under the autogenous pressure of the polymerization system. Exceptions are copolymerizations of THF with volatile 1,2-alkylene oxides, which are advantageously carried out under superatmospheric pressure. The pressure is usually from 0.1 to 20 bar, preferably from 0.5 to 2 bar.

To avoid the formation of ether peroxides, the polymerization is advantageously carried out under an inert gas atmosphere. Inert gases which can be used are, for example, nitrogen, carbon dioxide or noble gases; preference is given to using nitrogen.

The polymerization is particularly advantageously carried out under a hydrogen atmosphere. This embodiment results in a particularly low color number of the polymers formed. The hydrogen partial pressure can be chosen in the range from 0.1 to 50 bar. When carrying out the polymerization in the presence of hydrogen, the color number can be improved further by doping the polymerization catalyst with transition metals or mixing the polymerization catalyst with a catalyst comprising transition metal(s). Suitable transition metals are the elements of groups 7 to 10 of the Periodic Table, for example ruthenium, rhenium, nickel, iron, cobalt, palladium and/or platinum.

The process of the present invention can be carried out batchwise or continuously. For economic reasons, continuous operation is generally preferred.

When the process is carried out batchwise, the reactants THF, the relevant telogen and/or, if desired, the comonomer and the catalyst are generally reacted in a stirred vessel or loop reactor at the temperatures indicated until the desired conversion of THF has been reached. The reaction time can be from 0.5 to 40 hours, preferably from 1 to 30 hours, depending on the amount of catalyst added. The catalysts are generally added to the polymerization mixture in an amount of from 1 to 90% by weight, preferably from 4 to 70% by weight and particularly preferably from 8 to 60% by weight, based on the weight of the THF used.

In the case of a continuous process, a reaction can be carried out in the suspension mode or the fixed-bed mode in conventional reactors or reactor assemblies suitable for continuous processes, in the case of the suspension mode in, for example, loop reactors or stirred reactors and in the case of the fixed-bed mode in tube reactors or fixed-bed reactors. The fixed-bed mode is preferred.

In the preferred fixed-bed mode, the polymerization reactor can be operated in the upflow mode, i.e. the reaction mixture is conveyed from the bottom upward, or in the downflow mode, i.e. the reaction mixture is passed through the reactor from the top downward. The feed comprising THF and telogen and/or comonomer is fed continuously to the polymerization reactor, with the WHSV over the catalyst being from 0.01 to 2.0 kg of THF/(1*h), preferably from 0.02 to 1.0 kg of THF/(1*h) and particularly preferably from 0.04 to 0.5 kg of THF/(1*h).

Furthermore, the polymerization reactor can be carried out in a single pass, i.e. without recirculation of product, or in the circulation mode, i.e. part of the polymerization mixture leaving the reactor is recirculated. In the recirculation mode, the ratio of recirculated reaction mixture to fresh feed is less than or equal to 100:1, preferably less than 80:1 and preferably less than 60:1.

The concentration of the carboxylic anhyride used as telogen in the feed fed to the polymerization reactor is from 0.03 to 30 mol %, preferably from 0.05 to 20 mol %, particularly preferably from 0.1 to 10 mol %, based on the THF used.

If a carboxylic acid is used in addition, the molar ratio of this to carboxylic anhydride in the feed is usually from 1:20 to 1:20000.

If comonomers are used in addition, the molar ratio of these to THF in the feed is usually from 0.1 to 50 mol %, preferably from 0.5 to 40 mol %, particularly preferably from 1 to 30 mol %.

If the polymerization has been carried out by a suspension process, work-up of the polymerization product is carried out by separating off the major part of the polymerization catalyst from the polymerization mixture, for example by filtration, decantation or centrifugation, and passing the polymerization product obtained to further work-up. In the preferred fixed-bed mode, the polymerization product is directly worked up further.

The work-up of the particularly preferred PTHF acetates or THF copolymer acetates can be carried out by methods known per se. For example, unreacted THF and any acetic anhydride, acetic acid and comonomer are firstly separated off by distillation and the resulting PTHF acetate or THF copolymer acetate is transesterified with methanol in the presence of a basic catalyst to form PTHF or THF copolymer and methyl acetate.

If desired, low molecular weight PTHF and/or tetrahydrofuran copolymer having a mean molecular weight of from 200 to 700 dalton can subsequently be separated off by distillation. Low molecular weight cyclic oligomers can usually also be separated off by distillation in this way. The distillation residue which remains consists of PTHF or THF copolymer having a mean molecular weight of from 650 to 10000 dalton.

After use in a batchwise or continuous PTHF process, the catalysts of the present invention can be regenerated, for example by heat treatment as described in EP-A-0 535 515 and/or by washing the catalyst with aqueous and/or organic solvents.

The invention is illustrated by the examples below.

I. Analytical Examination of the Catalysts

The porosity and pore volume distribution of the catalysts were determined by mercury intrusion in accordance with DIN 66133. The data were evaluated in the pore radius range from 20 Å to 10 μm. Reported maxima in the pore radius distribution are based on a logarithmic plot of the pore radius.

II. Determination of the Initial Activity of the Catalyst in Powder Form 200 g of tetrahydrofuran and 20 g of acetic anhydride are placed in a 250 ml flask and heated to 50° C. While stirring vigorously, 5 g of finely powdered catalyst which has been dried at 120° C. and has a particle size of <100 μm is added and vigorous stirring of the reaction mixture is continued at 50° C. 20 ml samples of the reaction mixture are taken after 45 minutes, 2 h, 4 h and 6 h and are in each case immediately separated from the catalyst powder by filtration. The samples which have been freed of the catalyst are analyzed to determine their PTHF diacetate content, e.g. by distillating off the low boilers and weighing the PTHF diacetate. The initial productivity of the catalyst powder is determined by extrapolation of the plot of PTHF diacetate formation versus time.

III. Determination of the Activity of Shaped Catalyst Bodies

A 120 ml tube reactor provided with a double wall for temperature control and a recirculation loop was charged with 100 ml of dried shaped catalyst bodies which had previously been dried at 150° C. for 24 hours. A mixture of 200 g of tetrahydrofuran and 20 g of acetic anhydride was subsequently pumped at 50° C. (measured in the circulated thermostated liquid for the double wall) under protective gas through the catalyst bed at a circulation rate of 1 l/h. Samples were taken from the reaction mixture after 15, 30, 45, 60, 90 and 120 minutes and analyzed for their polymer content (see under II.). The initial productivity of the shaped catalyst bodies was determined by extrapolation of the plot of PTHF diacetate formation versus time.

The above-described examples of the determination of the activity can easily be adapted in respect of type and amount of telogens and/or comonomers, temperature, pressure, etc., to the respective use conditions of the catalyst. Furthermore, variation of amounts of catalyst and reaction times enables the process to be easily adapted to various initial activities.

EXAMPLE A

Comparative Catalyst 350 g of an acid-activated sheet silicate (bleaching earth K10, from Südchemie) having a powder activity of 7.8 g/g*h was intensively kneaded with 225 ml of water in a laboratory kneader for 2.5 hours, subsequently extruded to give extrudates having a diameter of 2.5 mm and a mean length of 10 mm, dried and calcined at 350° C. The pore radius distribution (Hg porosimetry) of this catalyst displays no discernible maximum in the pore radius range >20 Å, and the porosity in the pore radius range from 200 Å to 3000 Å is 0.035 cm$^3$/g. The activity of the shaped bodies of this comparative catalyst serves as reference for the other catalysts.

EXAMPLE B

Catalyst 1 According to the Present Invention 350 g of an acid-activated sheet silicate (bleaching earth K10, from Südchemie) having a powder activity of 7.8 g/g*h was intensively kneaded with 260 ml of water in a laboratory kneader for 26 minutes, subsequently extruded to give extrudates having a diameter of 2.5 mm and a mean length of 10 mm, dried and calcined at 350° C. The pore radius distribution (Hg porosimetry) of this catalyst is bimodal with maxima at pore radii of 60 Å and 1000 Å, and the porosity in the pore radius range from 200 Å to 3000 Å is 0.15 cm$^3$/g. The activity of the shaped bodies of this catalyst is about 2.9 times that of the comparative catalyst from Example A.

Catalyst 2 According to the Present Invention 387 g of an acid-activated sheet silicate (bleaching earth K10, from Südchemie) having a powder activity of 7.8 g/g*h were firstly precalcined at 300° C., then intensively kneaded with 300 ml of water in a laboratory kneader for 25 minutes, subsequently extruded to form extrudates having a diameter of 2.5 mm and a mean length of 10 mm, dried and subsequently calcined at 350° C. The pore radius distribution (Hg porosimetry) of this catalyst is bimodal with a weak maximum in the range from 20 to 100 Å and a distinct maximum at 3000 Å. The porosity in the pore radius range from 200 to 3000 Å is 0.32 cm$^3$/g. The activity of the shaped bodies of this catalyst is about 4.9 times that of the comparative catalyst from Example A.

IV. Continuous Polymerization of THF to Give PTHF Diacetate

EXAMPLE C

Comparative Catalyst

In a laboratory apparatus, a mixture of THF and acetic anhydride (6.9% based on the total feed) was passed at 45° C. under protective gas over the comparative catalyst from example A which had been predried at 140° C. and was installed as a fixed bed in a 250 ml reactor (internal diameter: 40 mm). The WHSV over the catalyst was 0.2 kg of feed/(l of cat.*h). The reactor was operated with product recirculation (1 l/h). To work up the PTHF diacetate, the reaction mixture obtained was freed of unreacted THF and acetic anhydride by distillation. The loss on distillation was 36%, and the molecular weight $M_n$ of the PTHF diacetate was 760 g/mol.

EXAMPLE D

Catalyst 3 According to the Present Invention 300 g of an acid-activated sheet silicate (bleaching earth K10, from Südchemie) having a powder activity of 5.4 g/g*h were firstly precalcined at 300° C., then intensively kneaded with 190 ml of water in a laboratory kneader for 25 minutes, subsequently extruded to form extrudates having a diameter of 2.5 mm and a mean length of 10 mm, dried and subsequently calcined at 350° C. The pore radius distribution (Hg porosimetry) of this catalyst is bimodal with a weak maximum in the range from 20 to 100 Å and a distinct maximum at 3000 Å. The porosity in the pore radius range from 200 to 3000 Å is 0.27 cm$^3$/g.

In a laboratory apparatus, a mixture of THF and acetic anhydride (6.9% based on the total feed) was passed at 45° C. under protective gas over this catalyst which had been predried at 140° C. and was installed as a fixed bed in a 250 ml reactor (internal diameter: 40 mm). The WHSV over the catalyst was 0.2 kg of feed/(l of cat.*h). The reactor was operated with product recirculation (1 l/h). To work up the PTHF diacetate, the reaction mixture obtained was freed of unreacted THF and acetic anhydride by distillation. The loss on distillation was 51%, and the molecular weight $M_n$ of the PTHF diacetate was 960 g/mol.

We claim:

1. A catalyst for the preparation of polytetrahydrofuran, polytetrahydrofuran copolymers, diesters or monoesters of these polymers by polymerization of tetrahydrofuran in the presence of at least one telogen and/or comonomer, which is in the form of shaped catalyst bodies or catalyst particles having a volume of the individual shape of the body or particle of at least 0.05 mm$^3$ and has both of the features a) and b):
    a) a pore radius distribution having at least one maximum in the pore radius range from 100 to 5000 Å,
    b) a pore volume of catalyst pores having radii of 200 to 3000 Å of greater than 0.05 cm$^3$/g and/or a pore volume of pores having radii of 200 to 5000 Å of greater than 0.075 cm$^3$/g and/or a pore volume of pores having radii >200 Å of greater than 0.1 cm$^3$/g,
    and wherein the active catalyst composition is selected from among sheet silicates.

2. A catalyst as claimed in claim 1, wherein 50% of the total pore volume is made up by pores having a diameter of >0.1 μm.

3. A catalyst as claimed in claim 1 which is produced from a catalyst precursor in powder form.

4. A catalyst as claimed in claim 1, wherein the catalyst precursor in powder form or the pulverized catalyst has an initial activity of at least 0.5 g of polymer/g of catalyst and hour of reaction time.

5. A catalyst as claimed in claim 1, wherein the sheet silicate is selected from the group consisting of the montmorillonite/saponite group the kaolin/serpentine group and the palygorskite/sepiolite group.

6. A catalyst as claimed in claim 5, wherein the sheet silicate is selected from among montmorillonite, hectorite, kaolin attapulgite, sepiolite and mixtures thereof.

7. A process for producing a catalyst as claimed in claim 1, wherein the shaped catalyst bodies are produced from pulverulent raw materials tabletting, agglomeration or extrusion, with auxiliaries, selected from the group consisting of binders, lubricants and solvents, being added during shaping.

8. A process as claimed in claim 6, wherein shaping is performed by agglomeration or extrusion in the presence of water as auxiliary.

9. A catalyst as claimed in claim 1, wherein the shaped catalyst bodies or catalyst particles have a volume of 0.2 mm$^3$.

10. A process for preparing polytetrahydrofuran, polytetrahydrofuran copolymers, diesters or monoesters of these polymers, which comprises polymerizing tetrahydrofuran in the presence of at least one telogen and/or comonomer and using a catalyst which is in the form of shaped catalyst bodies catalyst particles having a volume of the individual shape of the body or particle of at least 0.05 mm$^3$, and has both of the features a) and b):
    a) a pore radius distribution having at least one maximum in the pore radius range from 100 to 5000 Å.
    b) a pore volume of catalyst pores having radii of 200 to 3000 Å of greater than 0.05 cm$^3$/g and/or a pore volume of pores having radii of 200 to 5000 Å of greater than 0.075 cm$^3$/g and/or a pore volume of pores having radii of >200 Å of greater than 0.1 cm$^3$/g.

11. A process as claimed in claim 10 which is carried out continuously or batchwise.

12. A process as claim in claim 11, which is carried out in a fixed-bed mode.

13. A process as claimed in claim 10, wherein tetrahydrofuran is polymerized in the presence of carboxylic anhydrides to give polytetrahydrofuran or derivatives and copolymers thereof having molecular weight of from 250 to 10,000.

14. A process as claimed in claim 13, wherein the carboxylic anhydride is acetic anhydride.

15. A process as claimed in claim 13, wherein the molecular weight is from 650 to 4,000 dalton.

* * * * *